United States Patent
Wang et al.

(10) Patent No.: US 10,048,804 B2
(45) Date of Patent: *Aug. 14, 2018

(54) METHOD FOR PREVENTING FALSE TOUCHES ON TERMINAL AND TERMINAL

(71) Applicant: Guangdong Oppo Mobile Telecommunications Corp., Ltd., Dongguan, Guangdong (CN)

(72) Inventors: Zuopeng Wang, Guangdong (CN); Haiping Zhang, Guangdong (CN)

(73) Assignee: Guangdong Oppo Mobile Telecommunications Corp., Ltd., Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/810,172

(22) Filed: Nov. 13, 2017

(65) Prior Publication Data
US 2018/0081493 A1  Mar. 22, 2018

Related U.S. Application Data

(63) Continuation of application No. 15/628,222, filed on Jun. 20, 2017, which is a continuation of application No. PCT/CN2016/082445, filed on May 18, 2016.

(30) Foreign Application Priority Data

Aug. 27, 2015 (CN) .......................... 2015 1 0537174

(51) Int. Cl.
G06F 3/044 (2006.01)
G06F 3/041 (2006.01)
G06F 3/0488 (2013.01)

(52) U.S. Cl.
CPC ............ *G06F 3/0418* (2013.01); *G06F 3/044* (2013.01); *G06F 3/0412* (2013.01); *G06F 3/0488* (2013.01)

(58) Field of Classification Search
CPC combination set(s) only.
See application file for complete search history.

(56) References Cited

U.S. PATENT DOCUMENTS

| 2013/0335373 | A1 | 12/2013 | Tomiyasu |
| 2014/0022174 | A1 | 1/2014 | Chen |
| 2014/0164973 | A1 | 6/2014 | Greenzeiger et al. |
| 2015/0169125 | A1 | 6/2015 | Ito et al. |
| 2015/0220119 | A1* | 8/2015 | Seo .......................... G06F 3/041 345/173 |
| 2016/0328112 | A1* | 11/2016 | Jiang ..................... G06F 3/0416 |

FOREIGN PATENT DOCUMENTS

| CN | 101211235 A | 7/2008 |
| CN | 101980117 A | 2/2011 |
| CN | 102314290 A | 1/2012 |

(Continued)

*Primary Examiner* — Jennifer Mehmood
*Assistant Examiner* — Deeprose Subedi
(74) *Attorney, Agent, or Firm* — Young Basile Hanlon & MacFarlane, P.C.

(57) ABSTRACT

A method for preventing false touches on a terminal and a terminal includes: a touch operation on a touch screen of a terminal is detected and a touch parameter of the touch operation is obtained. If the touch parameter matches a preset touch parameter, it is determined that the touch operation is an invalid operation, and the touch operation will be responded nothing.

6 Claims, 8 Drawing Sheets

(56) References Cited

FOREIGN PATENT DOCUMENTS

| | | |
|---|---|---|
| CN | 102346596 A | 2/2012 |
| CN | 102479040 A | 5/2012 |
| CN | 103092386 A | 5/2013 |
| CN | 103258171 A | 8/2013 |
| CN | 103713809 A | 4/2014 |
| CN | 104182145 A | 12/2014 |
| CN | 104583903 A | 4/2015 |
| CN | 105045454 A | 11/2015 |

* cited by examiner

METHOD FOR PREVENTING FALSE TOUCHES ON TERMINAL AND TERMINAL

CROSS-REFERENCE TO RELATED APPLICATION(S)

This application is a continuation of U.S. application Ser. No. 15/628,222, filed on Jun. 20, 2017, which is a continuation of international application No. PCT/CN2016/082445, filed on May 18, 2016, which claims priority to Chinese Patent Application No. 201510537174.6, filed on Aug. 27, 2015, the contents of all of which are herein incorporated by reference in their entireties.

TECHNICAL FIELD

The present disclosure relates to the field of electronic technology, and particularly to a method for preventing false touches on a terminal and a terminal.

BACKGROUND

Currently, a terminal such as a smart phone, a Tablet PC and the like is generally equipped with a touch screen (or touch panel) with which users can use various functions of the terminal conveniently and efficiently, for example, chatting, dialing, working, taking pictures, playing games, shopping, watching videos and the like. Generally, the users conduct operations on the terminal by motions such as clicking or sliding on the touch screen of the terminal with fingers. However, when the touch screen of the terminal is in an unlocked state and if the fingers, arms or other parts of the users inadvertently touch or press the touch screen, the terminal will conduct actions triggered by touching or pressing, which may lead to misuse, such as dialing, deleting messages, opening a Web page, turning on the camera and the like, and this gives the users a lot of trouble. Therefore, how to provide a scheme that can effectively prevent the terminal from being operated accidentally has become an urgent problem to be solved.

BRIEF DESCRIPTION OF THE DRAWINGS

In order to illustrate the technical solutions of the implementations of the present disclosure more clearly, the drawings used in the implementations will be briefly described, it will be apparent that the drawings described in the following are implementations of the present disclosure, and it will be apparent to those skilled in the art that other drawings can be obtained from the drawings without any creative work.

DETAILED DESCRIPTION

Technical solutions of the present disclosure will be described clearly and completely with reference to the accompanying drawings; obviously, implementations described are merely part of rather than all of implementations of the present disclosure. Based on the implementations of the present disclosure, other implementations obtained there from without any creative work by those of ordinary skill in the art shall fall into the protection scope of the present disclosure.

"Terminal" of implementations of the present disclosure can include a smart phone (such as an Android phone, an iOS phone, a windows phone and the like), a tablet PC, a handheld PC, a laptop, a mobile internet device (MID), a wearable device and the like. The above-mentioned terminal is illustrated by way of example only and not exhaustive. The terminal can include but not limited to those described above.

In the method for preventing false touches on a terminal of the implementation of the present disclosure, a terminal detects a touch operation on a touch screen of the terminal and obtains a touch parameter of the touch operation so as to judge whether the touch parameter matches a preset touch parameter. If the touch parameter matches the preset touch parameter, the terminal determines that the touch operation is an invalid operation and will respond nothing to the touch operation. The method for preventing false touches on a terminal provided in the implementations of the present disclosure will be described in detail with reference to FIG. 1 to FIG. 3.

Figure 1:
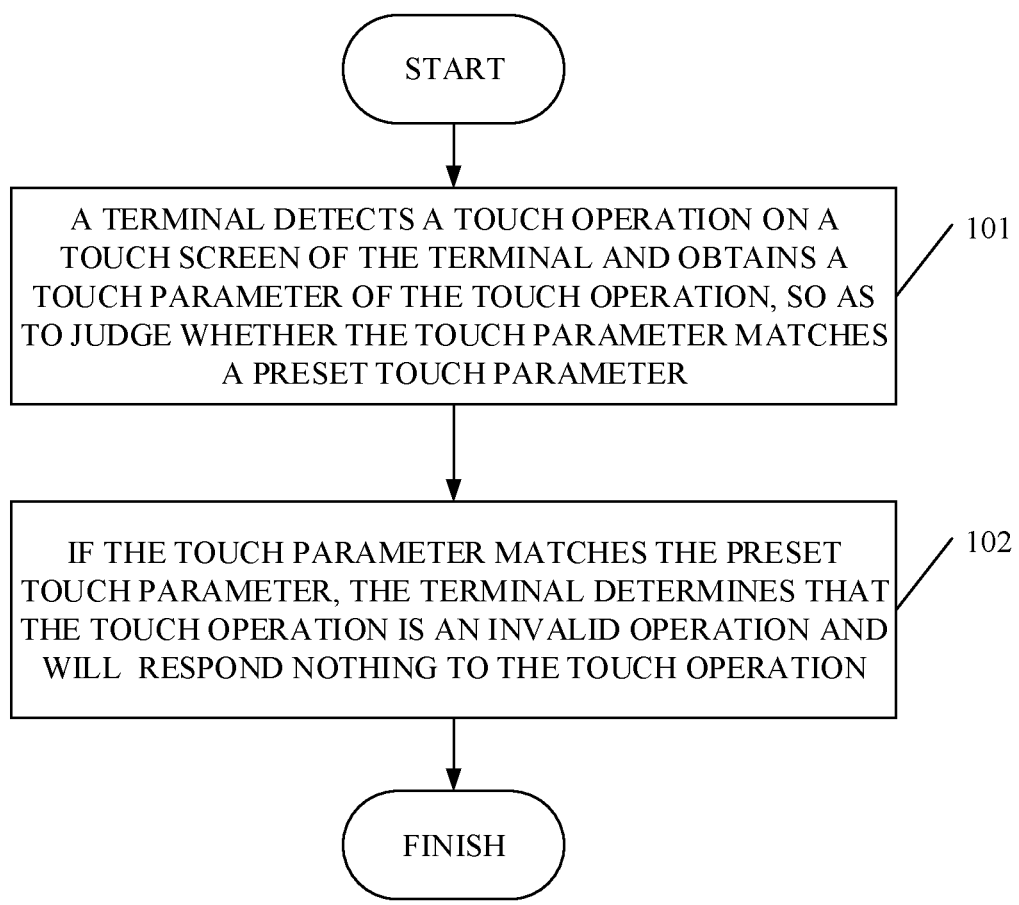
FIG. 1 is a flow chart diagram of a method for preventing false touches on a terminal according to a first implementation of the present disclosure.

Referring to FIG. 1, FIG. 1 is a flow chart diagram of a method for preventing false touches on a terminal according to a first implementation of the present disclosure. The method for preventing false touches on a terminal described in the implementation of the present disclosure can begin at block 101.

At block 101, a terminal detects a touch operation on a touch screen of the terminal and obtains a touch parameter of the touch operation, so as to judge whether the touch parameter matches a preset touch parameter.

In some possible implementations, the touch screen can be integrated with a touch function and a display function; that is, in the implementation of the present disclosure, the touch screen of the terminal can be used as a touch panel provided for touch operations of users, and can be used as a display screen for displaying corresponding data information to users of the terminal.

The touch operation can include pressing (that is, clicking), sliding, and other operations. The pressing operation can further be divided into short pressing, long pressing, single click, multiple clicks and the like. The sliding operation can further be divided into linear sliding, curvilinear sliding and the like. The touch parameter of the touch operation can include a press force value, a press duration and the like.

In a specific implementation, the terminal can create a touch event monitoring thread in the background of a system, which is used for detecting the touch operation of users on the touch screen of the terminal with fingers, a capacitive pen and the like, and when an inputted touch operation is detected, the terminal can obtain the touch parameter of the touch operation such as the press force value, the press duration and the like; the press duration is a continuous duration that the touch operation effects on the touch screen.

In some possible implementations, after the terminal detects the touch operation on the touch screen of the terminal and obtains the touch parameter of the touch operation, the terminal can further judge whether the touch parameter matches the preset touch parameter. If the touch parameter matches the preset touch parameter, proceed to the block 102; otherwise, the process ends.

In a specific implementation, the terminal can set one or multiple invalid operation conditions (that is a mis-operation). Each invalid operation condition specifically corresponds to a different preset touch parameter, and when the touch parameter of the touch operation matches a preset touch parameter, it means that the touch operation meets an invalid operation condition.

In some possible implementations, the preset touch parameter can be a preset duration. In this situation, the terminal obtains a target duration from the detection of the touch operation until the press force value reaches the maximum value during the press duration. The terminal further compares the target duration with the preset duration, and if the target duration is less than or equal to the preset duration, the terminal can determine that the current touch operation is conducted instantaneously, that is, the terminal can determine that the current touch operation is an invalid operation.

In some possible implementations, the preset touch parameter can be a preset second press force threshold. In this situation, the terminal obtains the maximum value and the minimum value of the press force value during the press duration, and calculates the difference between the maximum value and the minimum value on the basis of the maximum value and the minimum value. The terminal further compares the difference with the preset second press force threshold, and if the difference is less than or equal to the preset second press force threshold, the terminal can determine that the press force value of the current touch operation is substantially constant, or the current touch operation is conducted instantaneously, that is, the terminal can determine that the current touch operation is an invalid operation.

In some possible implementations, the preset touch parameter can be a preset fourth press force threshold. In this situation, the terminal obtains the average value of the press force value during the press duration, and further compares the average value with the preset fourth press force threshold. If the average value is less than or equal to the preset fourth press force threshold, the terminal can determine that the press force value of the current touch operation is substantially constant, or the current touch operation is conducted instantaneously, that is, the terminal can determine that the current touch operation is an invalid operation.

At block 102, if the touch parameter matches the preset touch parameter, the terminal determines that the touch operation is an invalid operation and will respond nothing to the touch operation.

In a specific implementation, if the terminal judges that the touch parameter matches the preset touch parameter, the terminal can determine that the touch operation is an invalid operation and will respond nothing to the touch operation, thereby preventing the touch operation from erroneously triggering a corresponding function of the terminal, for example, erroneously dialing, erroneously deleting messages, and erroneously turning on the camera and the like.

Operations of block 101~block 102 can be repeated for multiple times according to actual needs and/or application scenarios.

As can be seen from the implementations described above, a touch operation on a touch screen of a terminal can be detected and a touch parameter of the touch operation is obtained, so as to judge whether the touch parameter matches a preset touch parameter, and if the touch parameter matches the preset touch parameter, the terminal determines that the touch operation is an invalid operation and will respond nothing to the touch operation, thereby reducing the probability of the terminal being accidentally operated and enhancing user experience of the terminal.

There can be a plurality of manners in which the terminal judges whether a touch parameter matches a preset touch parameter, which will be described in detail with reference to FIG. 2 to FIG. 3.

Figure 2:
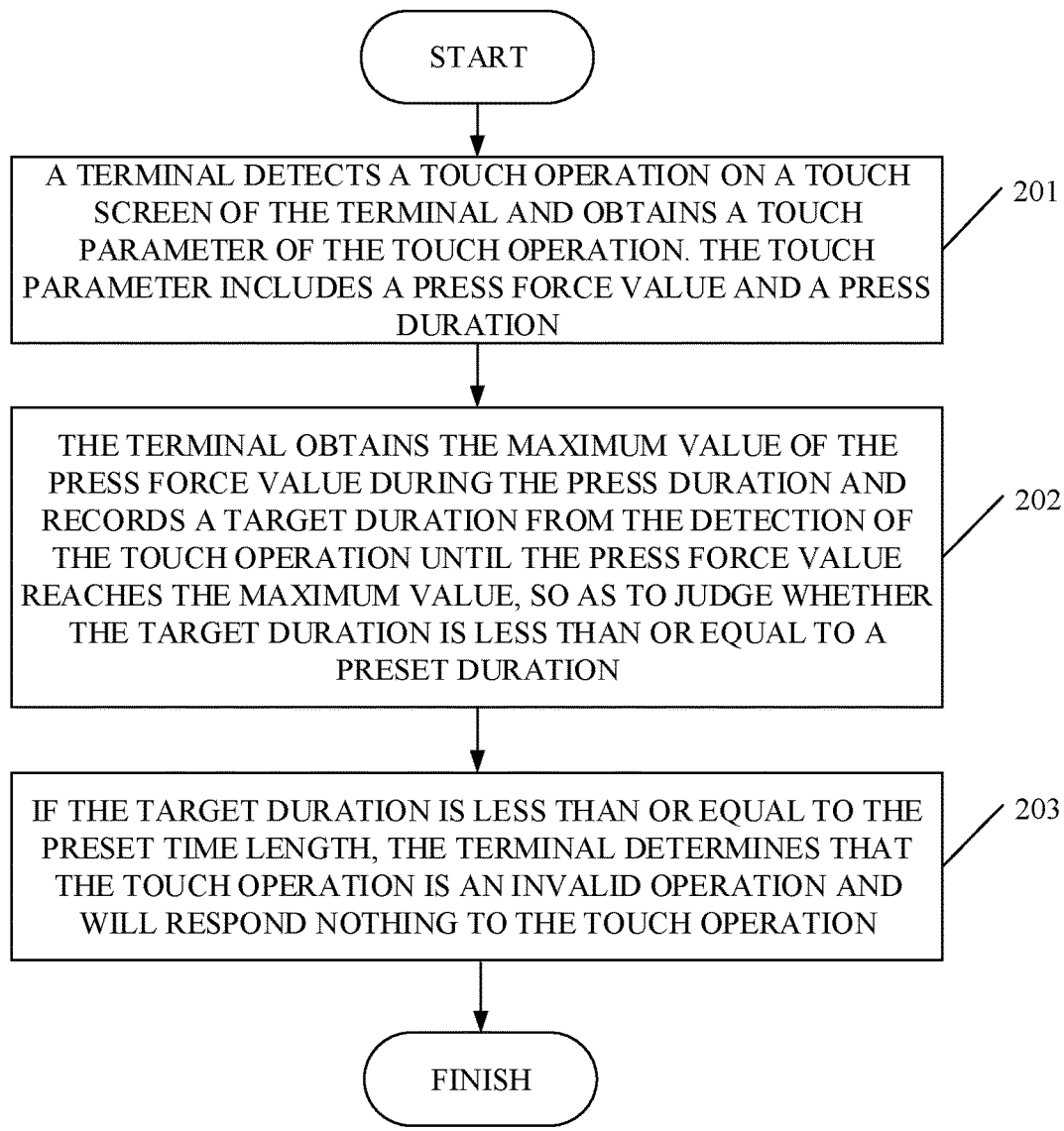
FIG. 2 is a flow chart diagram of the method for preventing false touches on a terminal according to a second implementation of the present disclosure.

Referring to FIG. 2, FIG. 2 is a flow chart diagram of the method for preventing false touches on a terminal according to a second implementation of the present disclosure. The method of FIG. 2 describes the implementation of a parameter matching operation in detail on the basis of FIG. 1. The method for preventing false touches on a terminal described in the implementation of the present disclosure can begin at block 201.

At block 201, a terminal detects a touch operation on a touch screen of the terminal and obtains a touch parameter of the touch operation. The touch parameter includes a press force value and a press duration.

During implementation, implementation of the process of detecting the touch operation on the touch screen of the terminal can refer to the description of block 101 of the first implementation, and it will not be repeated here.

The touch parameter in the implementation includes the press force value and the press duration, and the press duration is a continuous duration that the touch operation effects on the touch screen.

It should be noted that, the press force value can be expressed in units of Newton (N).

At block 202, the terminal obtains the maximum value of the press force value during the press duration and records a target duration from the detection of the touch operation until the press force value reaches the maximum value, so as to judge whether the target duration is less than or equal to a preset duration.

In a specific implementation, when the touch operation on the touch screen of the terminal by users has been detected, the terminal records this moment as a first moment and obtains the press force value of the touch operation in real time thereby obtaining the maximum value of the press force value during the press duration. Besides, the terminal records the moment that the press force value reaches the maximum value as a second moment, and on the basis of the first moment and the second moment, further obtains the target duration from the detection of the touch operation until the press force value reaches the maximum value.

In some possible implementations, after obtaining the maximum value of the press force value during the press duration, the terminal can first judge whether the maximum value is greater than or equal to a preset first press force threshold, that is, the terminal can judge whether the touch operation is a heavy pressing operation or a light clicking operation. If the maximum value is greater than or equal to the preset first press force threshold, that is, if the touch operation is the heavy pressing operation, the terminal records the target duration from the detection of the touch operation until the press force value reaches the maximum value, that is, in the implementation of the present disclosure, the terminal can merely judge whether the touch operation with a heavy press force is an invalid operation.

In some possible implementations, after the terminal obtains the maximum value of the press force value during the press duration and records the target duration from the detection of the touch operation until the press force value reaches the maximum value, the terminal can further judge whether the target duration is less than or equal to a preset duration. If the target duration is less than or equal to the preset duration, proceed to block 203.

Specifically, the terminal can count a duration that a press force value reaches the maximum value during a press duration of a touch operation inputted when the user operates the terminal normally, and determine the preset duration on the basis of the duration of a normal touch operation. For example, an average duration of the normal touch operation is 200 ms, the preset duration can be set to 100 ms, that is, a certain fault-tolerance range can be reserved between the average duration of the normal touch operation and the preset duration, so as to reduce the probability of misjudging the normal touch operation as an invalid operation. The terminal can adaptively adjust the specific value of the preset duration according to the change of the habit of touch operation input of the user.

Further, the terminal compares the target duration with the preset duration. If the target duration is less than or equal to the preset duration, the terminal can determine that the current touch operation is conducted instantaneously, that is, the terminal can determine that the current touch operation is an invalid operation.

At block 203, if the target duration is less than or equal to the preset duration, the terminal determines that the touch operation is an invalid operation and will respond nothing to the touch operation.

In a specific implementation, if the terminal judges that the target duration is less than or equal to the preset duration, the terminal determines that the touch operation is an invalid operation and will respond nothing to the touch operation, thereby preventing the touch operation from erroneously triggering a corresponding function of the terminal, for example, erroneously dialing, erroneously deleting messages, and erroneously turning on the camera and the like.

In some possible implementations, if the target duration is not less than or equal to the preset duration (in other words, if the target duration is longer than the preset duration), the terminal determines that the touch operation is a valid operation and conducts an action triggered by the touch operation.

Specifically, if the terminal judges that the target duration is longer than the preset duration, the terminal can determine that the touch operation is a valid operation, that is, the touch operation is inputted by the user intentionally, and then the terminal can conduct an action triggered by the touch operation, such as dialing, entering text information, sending short messages, taking pictures and the like.

As can be seen from the implementations described above, a touch operation on a touch screen of a terminal can be detected, a touch parameter of the touch operation is obtained and the touch parameter includes a press force value and a press duration. The maximum value of the press force value during the press duration is obtained and a target duration from the detection of the touch operation until the press force value reaches the maximum value is recorded, so that to judge whether the target duration is less than or equal to a preset duration. If the target duration is less than or equal to the preset duration, the terminal determines that the touch operation is an invalid operation and will respond nothing to the touch operation; otherwise, the terminal determines that the touch operation is a valid operation, and can conduct an action triggered by the touch operation, thereby reducing the probability of the terminal being accidentally operated and enhancing user experience of the terminal.

Figure 3:
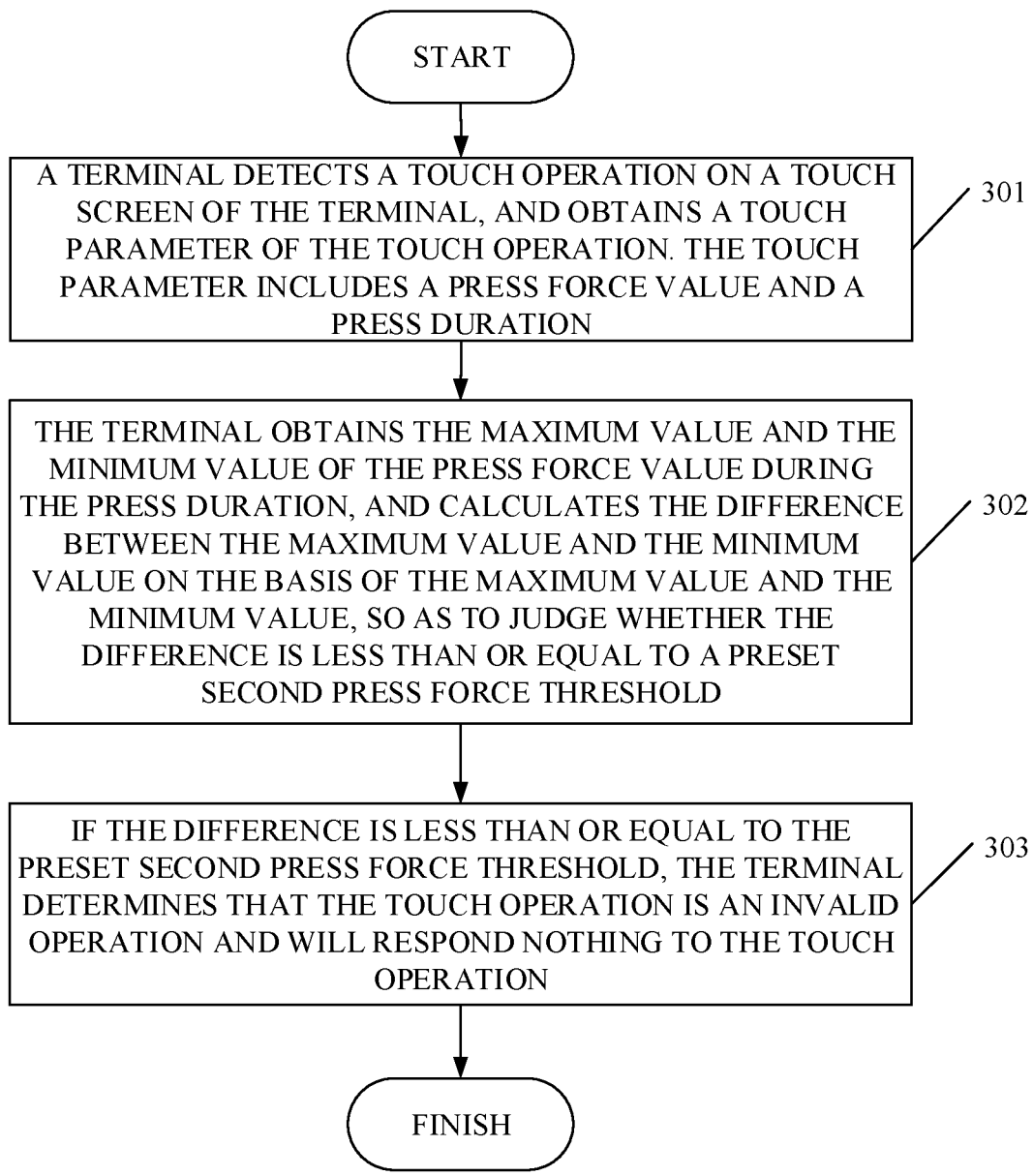
FIG. 3 is a flow chart diagram of the method for preventing false touches on a terminal according to a third implementation of the present disclosure.

In addition to the method of FIG. 2, FIG. 3 provides another implementation for the parameter matching operation of the method for preventing false touches on a terminal. In FIG. 2, parameter matching is performed based on the comparison of the target duration and the preset duration, in FIG. 3, the parameter matching will be performed based on the comparison among relevant values of a press force value.

Referring to FIG. 3, FIG. 3 is a flow chart diagram of the method for preventing false touches on a terminal according to a third implementation of the present disclosure. The method for preventing false touches on a terminal described in the implementation of the present disclosure can begin at block 301.

At block 301, a terminal detects a touch operation on a touch screen of the terminal, and obtains a touch parameter of the touch operation. The touch parameter includes a press force value and a press duration.

During implementation, implementation of the process of detecting the touch operation on the touch screen of the terminal can refer to the description of block 101 of the first implementation, and it will not be repeated here.

The touch parameter in the implementation includes the press force value and the press duration, and the press duration is a continuous duration that the touch operation effects on the touch screen.

It should be noted that the press force value can be expressed in units of Newton (N).

At block 302, the terminal obtains the maximum value and the minimum value of the press force value during the press duration, and calculates the difference between the maximum value and the minimum value on the basis of the maximum value and the minimum value, so as to judge whether the difference is less than or equal to a preset second press force threshold.

In a specific implementation, when the touch operation on the touch screen of the terminal by users has been detected, the terminal can obtain the press force value of the touch operation in real time thereby obtaining the maximum value and the minimum value of the press force value during the press duration and calculating the difference between the maximum value and the minimum value.

In some possible implementations, after obtaining the maximum value and the minimum value of the press force value during the press duration, the terminal can first judge whether the maximum value is greater than or equal to a preset third press force threshold, that is, the terminal can judge whether the touch operation is a heavy pressing operation or a light clicking operation. If the maximum value is greater than or equal to the preset third press force threshold, that is, if the touch operation is the heavy pressing operation, the terminal calculates the difference between the maximum value and the minimum value on the basis of the maximum value and the minimum value, that is, in the implementation of the present disclosure the terminal can merely judge whether the touch operation with a heavy press force is an invalid operation.

In some possible implementations, after the terminal obtains the maximum value and the minimum value of the press force value during the press duration, and calculates the difference between the maximum value and the minimum value on the basis of the maximum value and the minimum value, the terminal can further judge whether the difference is less than or equal to the preset second press force threshold. If the difference is less than or equal to the preset second press force threshold, proceed to block 303.

Specifically, the terminal can count the difference between the maximum value and the minimum value of a press force value of a touch operation when the user operates the terminal normally, and determine the preset second press force threshold on the basis of the difference of a normal touch operation. For example, an average difference of the normal touch operation is 5N, then the preset second press force threshold can be set to 1N, that is, a certain fault-tolerance range is reserved between the average difference of the normal touch operation and the preset second press force threshold, so as to reduce the probability of misjudging the normal touch operation as an invalid operation. The terminal can adaptively adjust the specific value of the preset second press force threshold according to the change of the habit of touch operation input of the user.

Further, the terminal compares the difference with the preset second press force threshold. If the difference is less than or equal to the preset second press force threshold, the terminal determines that the press force value of the current touch operation is substantially constant, or the current touch operation is conducted instantaneously. That is, the terminal can determine that the current touch operation is an invalid operation.

At block 303, if the difference is less than or equal to the preset second press force threshold, the terminal determines that the touch operation is an invalid operation and will respond nothing to the touch operation.

In some possible implementation, the terminal can further preset a preset fourth press force threshold, obtain the average value of the press force value during the press duration and further judge whether the average value is greater than or equal to the preset fourth press force threshold. If the average value is greater than or equal to the preset fourth press force threshold, the terminal can determine that the touch parameter matches the preset touch parameter, that is, the terminal determines that the touch operation is an invalid operation and will respond nothing to the touch operation.

What needs to be explained is, the terminal can count the average value of the press force value of the touch operation inputted when the user operates the terminal normally, and determine the preset fourth press force threshold on the basis of the average value of a normal touch operation. For example, the average value of the press force value of the normal touch operation is 5N, then the preset fourth press force threshold can be set to 8N, that is, a certain fault-tolerance range is reserved between the average value of the press force value of the normal touch operation and the preset fourth press force threshold, so as to reduce the probability of misjudging the normal touch operation as an invalid operation. The terminal can adaptively adjust the specific value of the preset fourth press force threshold according to the change of the habit of touch operation input of the user.

In some possible implementation, if the difference is greater than the preset second press force threshold, the terminal determines that the touch operation is a valid operation and conducts an action triggered by the touch operation.

As can be seen from the implementations described above, a touch operation on a touch screen of a terminal can be detected, a touch parameter of the touch operation is obtained and the touch parameter includes a press force value and a press duration. The maximum value and the minimum value of the press force value during the press duration is obtained, and further the difference between the maximum value and the minimum value is calculated, so as to judge whether the difference is less than or equal to a preset second press force threshold. If the difference is less than or equal to the preset second press force threshold, the terminal determines that the touch operation is an invalid operation and will respond nothing to the touch operation; otherwise, the terminal determines that the touch operation is a valid operation, and can conduct an action triggered by the touch operation, thereby reducing the probability of the terminal being accidentally operated and enhancing user experience of the terminal.

Figure 4:
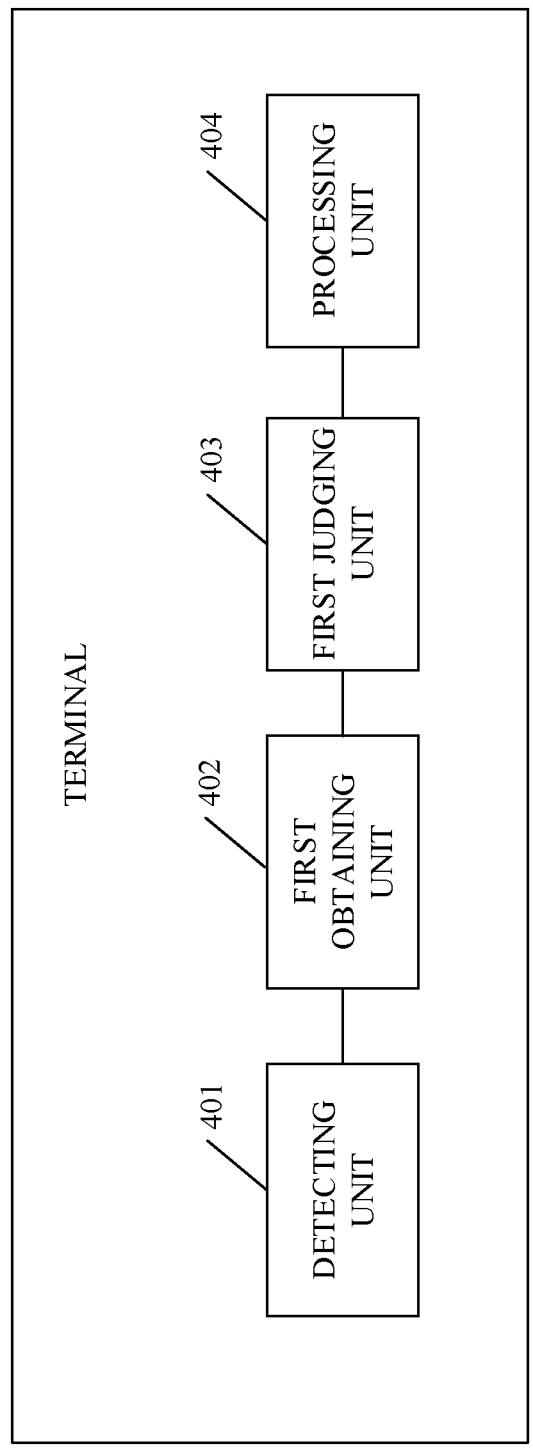
FIG. 4 is a structure diagram of a terminal according to a first implementation of the present disclosure.

Referring to FIG. 4, FIG. 4 is a structure diagram of a terminal according to a first implementation of the present disclosure. The terminal described in the implementation of the present disclosure includes: a detecting unit 401 (such as a detector), a first obtaining unit 402 (such as a processor), and a processing unit 404 (such as a processor). As one implementation, the detecting unit 401 and the first obtaining unit 402 can be integrated into one element. Furthermore, the terminal can still include a hardware processor (not illustrated in the Figure) configured to perform the elements mentioned above or those described in the following. Specifically, the hardware processor can be connected with a memory via a BUS, where the memory is configured to store one or more programs, when executed by the hardware processor, the programs are adapted to perform the method for preventing false touches on a terminal or the elements of the terminal according to implementations of the present disclosure.

The detecting unit 401 is configured to detect a touch operation on a touch screen of the terminal.

In some possible implementations, the touch screen can be integrated with a touch function and a display function; that is, in the implementation of the present disclosure, the touch screen of the terminal can be used as a touch panel provided for touch operations of users, and can be used as a display screen for displaying corresponding data information to users of the terminal.

The touch operation can include pressing (that is, clicking), sliding and other operations. The pressing operation can further be divided into short pressing, long pressing, single click, multiple clicks and the like. The sliding operation can further be divided into linear sliding, curvilinear sliding and the like. A touch parameter of the touch operation can include a press force value, a press duration and the like.

The first obtaining unit 402 unit is configured to obtain the touch parameter of the touch operation, so as to judge whether the touch parameter matches a preset touch parameter.

In a specific implementation, the detecting unit 401 can create a touch event monitoring thread in the background of a system, which is used for detecting the touch operation of users on the touch screen of the terminal with fingers, a capacitive pen and the like. When the detecting unit 401 detects an inputted touch operation, the first obtaining unit 402 obtains the touch parameter of the touch operation such as the press force value, the press duration and the like; the press duration is a continuous duration that the touch operation effects on the touch screen.

In some possible implementations, the terminal can further include a first judging unit 403 (such as a processor or a comparator); the first judging unit 403 is configured to judge whether the touch parameter matches the preset touch parameter.

In a specific implementation, the terminal can set one or multiple invalid operation conditions (that is a mis-operation). Each invalid operation condition specifically corresponds to a different preset touch parameter, and when the touch parameter of the touch operation matches a preset touch parameter, the first judging unit 403 judges that the touch operation meets an invalid operation condition.

In some possible implementations, the preset touch parameter can be a preset duration. In this situation, the terminal obtains a target duration from the detection of the touch operation until the press force value reaches the maximum value during the press duration. The first judging unit 403 further compares the target duration with the preset duration, and if the target duration is less than or equal to the preset duration, the terminal can determine that the current touch operation is conducted instantaneously, that is, the terminal can determine that the current touch operation is an invalid operation.

In some possible implementations, the preset touch parameter can be a preset second press force threshold. In this situation, the terminal obtains the maximum value and the minimum value of the press force value during the press duration, and calculates the difference between the maximum value and the minimum value on the basis of the maximum value and the minimum value. The first judging unit 403 further compares the difference with the preset second press force threshold, and if the difference is less than or equal to a preset second press force threshold, the terminal can determine that the press force value of the current touch operation is substantially constant, or the current touch operation is conducted instantaneously, that is, the terminal can determine that the current touch operation is an invalid operation.

In some possible implementations, the preset touch parameter can be a preset fourth press force threshold. In this situation, the terminal obtains the average value of the press force value during the press duration, and the first judging unit 403 further compares the average value with the preset fourth press force threshold. If the average value is less than or equal to the preset fourth press force threshold, the terminal can determine that the press force value of the current touch operation is substantially constant, or the current touch operation is conducted instantaneously, that is, the terminal can determine that the current touch operation is an invalid operation.

The processing unit 404 is configured to determine that the touch operation is an invalid operation, and respond nothing to the touch operation if the first judging unit 403 judges that the touch parameter matches the preset touch parameter.

In a specific implementation, if the first judging unit 403 judges that the touch parameter matches the preset touch parameter, the processing unit 404 can determine that the touch operation is an invalid operation and will respond nothing to the touch operation thereby preventing the touch operation from erroneously triggering a corresponding function of the terminal, for example, erroneously dialing, erroneously deleting messages, and erroneously turning on the camera and the like.

By means of implementations of the present disclosure, a touch operation on a touch screen of a terminal can be detected and a touch parameter of the touch operation is obtained, so as to judge whether the touch parameter matches a preset touch parameter, and if the touch parameter matches the preset touch parameter, the terminal determines that the touch operation is an invalid operation and will respond nothing to the touch operation, thereby reducing the probability of the terminal being accidentally operated and enhancing user experience of the terminal.

The first judging unit 403 of the terminal will be described in detail with reference to FIG. 5 to FIG. 7.

Figure 5:
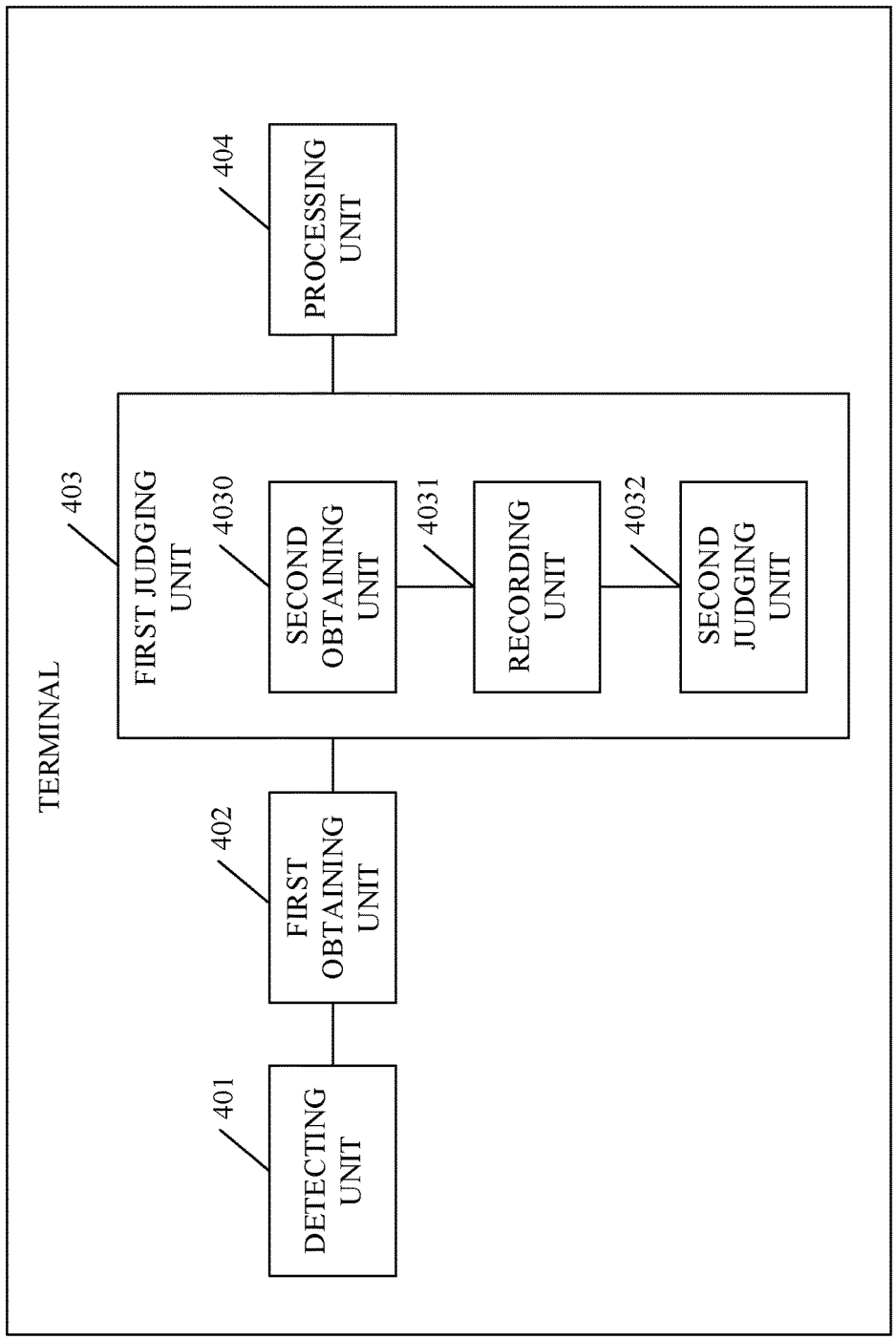
FIG. 5 is another structure diagram of the terminal according to a second implementation of the present disclosure.

Referring to FIG. 5, FIG. 5 is a structure diagram of a terminal according to a second implementation of the present disclosure. The terminal described in the implementation of the present disclosure includes a detecting unit 401, a first obtaining unit 402, and a processing unit 404.

The detecting unit 401 is configured to detect a touch operation on a touch screen of the terminal.

During implementation, implementation of the detecting unit 401 can refer to the description of the detecting unit 401 of the first implementation, and it will not be repeated here.

A touch parameter in the implementation includes a press force value and a press duration; the press duration is a continuous duration that the touch operation effects on the touch screen.

It should be noted that, the press force value can be expressed in units of Newton (N).

The first obtaining unit 402 is configured to obtain the touch parameter of the touch operation, so as to judge whether the touch parameter matches a preset touch parameter, and the touch parameter includes the press force value and the press duration.

In some possible implementations, the terminal can further include a first judging unit 403, and the first judging unit 403 is configured to judge whether the touch parameter matches a preset touch parameter.

The first judging unit 403 further includes a second obtaining unit 4030, a recording unit 4031 (such as a logic circuit) and a second determining unit 4032 (such as a logic circuit).

The second obtaining unit 4030 is configured to obtain the maximum value of the press force value during the press duration.

The recording unit 4031 is configured to record a target duration from the detection of the touch operation until the press force value reaches the maximum value.

The second determining unit 4032 is configured to determine that the touch parameter matches the preset touch parameter if the target duration is less than or equal to a preset duration.

Specifically, the recording unit 4031 can count a duration that a press force value reaches the maximum value during a press duration of a touch operation inputted when the user operates the terminal normally, and the terminal determines the preset duration of a normal touch operation. For example, an average duration of the normal touch operation that the recording unit 4031 counts is 200 ms, the preset duration can be set to 100 ms, that is, a certain fault-tolerance range can be reserved between the average duration of the normal touch operation and the preset duration, so as to reduce the probability of misjudging the normal touch operation as an invalid operation. The terminal can adaptively adjust the specific value of the preset duration according to the change of the habit of touch operation input of the user.

Further, the second determining unit 4032 compares the target duration with the preset duration. If the target duration is less than or equal to the preset duration, the terminal can determine that the current touch operation is conducted instantaneously, that is, the terminal can determine that the current touch operation is an invalid operation.

In some possible implementations, the second determining unit 4032 is further configured to judge whether the maximum value obtained by the second obtaining unit 4030 is greater than or equal to a preset first press force threshold, and if the maximum value is greater than or equal to the preset first press force threshold, trigger the recording unit 4031 to record the target duration from the detection of the touch operation until the press force value reaches the maximum value, that is, in the implementation of the present disclosure, the terminal can merely judge whether the touch operation with a heavy press force is an invalid operation.

The processing unit 404 is configured to determine that the touch operation is an invalid operation, and respond nothing to the touch operation if the first judging unit 403 judges that the touch parameter matches the preset touch parameter.

The processing unit 404 is further configured to determine that the touch operation is a valid operation and conduct an action triggered by the touch operation if the first judging unit 403 judges that the touch parameter does not match the preset touch parameter.

Figure 6:
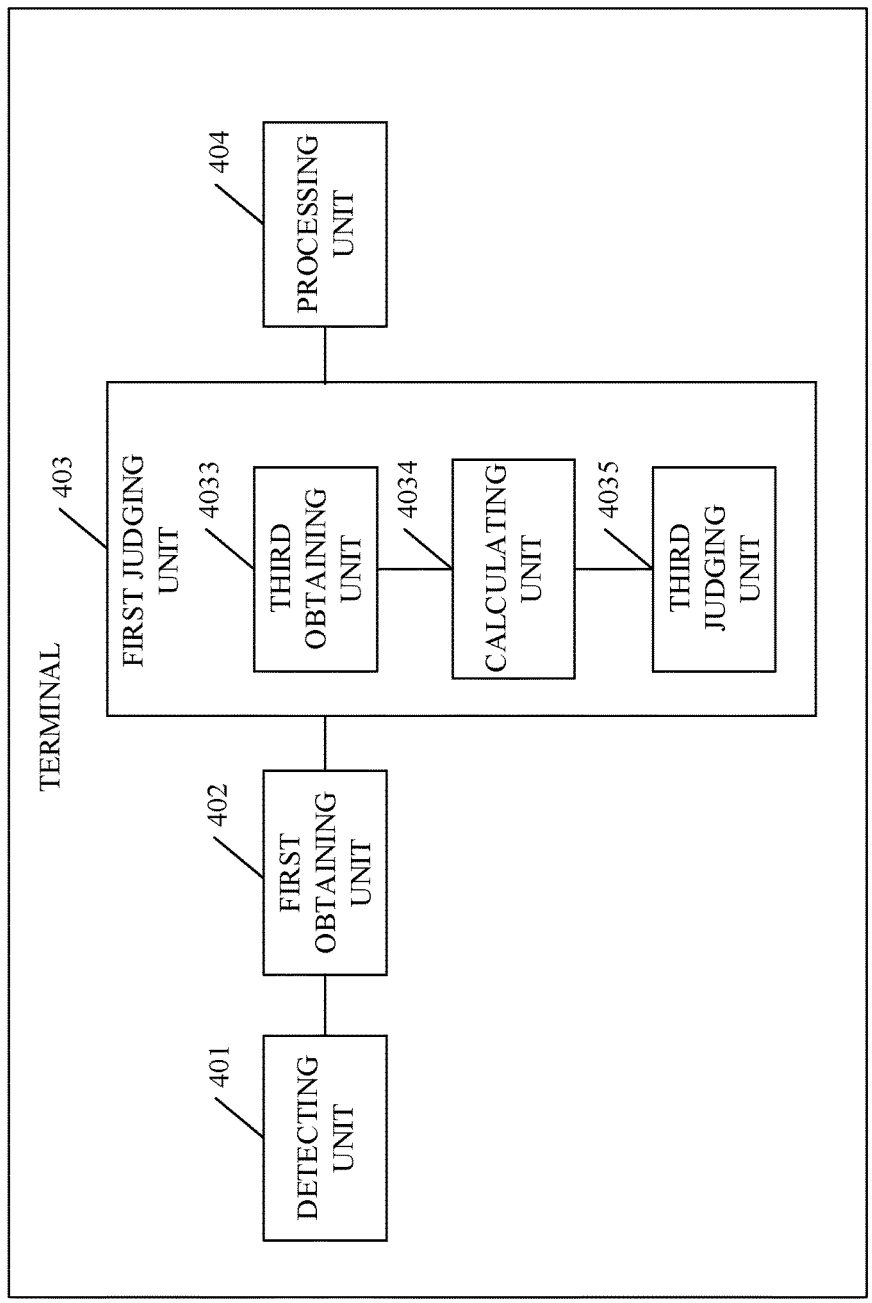
FIG. 6 is another structure diagram of the terminal according to a third implementation of the present disclosure.

Referring to FIG. 6, FIG. 6 is a structure diagram of another terminal according to a third implementation of the present disclosure, the detecting unit 401, the first obtaining unit 402, and the processing unit 404 have been described with reference to FIG. 5 and will not be repeated here. The first judging unit 403 further includes a third obtaining unit 4033 (such as a logic circuit), a calculating unit 4034 (such as a logic circuit), and a third determining unit 4035 (such as a logic circuit).

The third obtaining unit 4033 is configured to obtain the maximum value and the minimum value of the press force value during the press duration.

The calculating unit 4034 is configured to calculate the difference between the maximum value and the minimum value on the basis of the maximum value and the minimum value.

The third determining unit 4035 is configured to determine that the touch parameter matches the preset touch parameter if the difference is less than or equal to a preset second press force threshold.

In a specific implementation, when the detecting unit 401 has detected the touch operation on the touch screen of the terminal by the users, the third obtaining unit 4033 can obtain the press force value of the touch operation in real time so that the calculating unit 4034 obtains the maximum value and the minimum value of the press force value during the press duration and calculates the difference between the maximum value and the minimum value.

Further, the calculating unit 4034 can count the difference between the maximum value and the minimum value of a press force value of a touch operation when the user operates the terminal normally, and the terminal determines the preset second press force threshold on the basis of a normal touch operation. For example, an average difference of the normal touch operation is 5N, then the preset second press force threshold can be set to 1N, that is, a certain fault-tolerance range is reserved between the average difference of the normal touch operation and the preset second press force threshold, so as to reduce the probability of misjudging the normal touch operation as an invalid operation. The terminal can adaptively adjust the specific value of the preset second press force threshold according to the change of the habit of the touch operation input of the user.

Further, the third determining unit 4035 compares the difference with the preset second press force threshold. If the difference is less than or equal to the preset second press force threshold, the terminal determines that the press force value of the current touch operation is substantially constant, or the current touch operation is conducted instantaneously. That is, the terminal can determine that the current touch operation is an invalid operation.

In some possible implementations, the third determining unit 4035 is further configured to judge whether the maximum value obtained by the third obtaining unit 4033 is greater than or equal to a preset third press force threshold, and if the maximum value is greater than or equal to the preset third press force threshold, trigger the calculating unit 4034 to calculate the difference between the maximum value and the minimum value on the basis of the maximum value and the minimum value.

Figure 7:
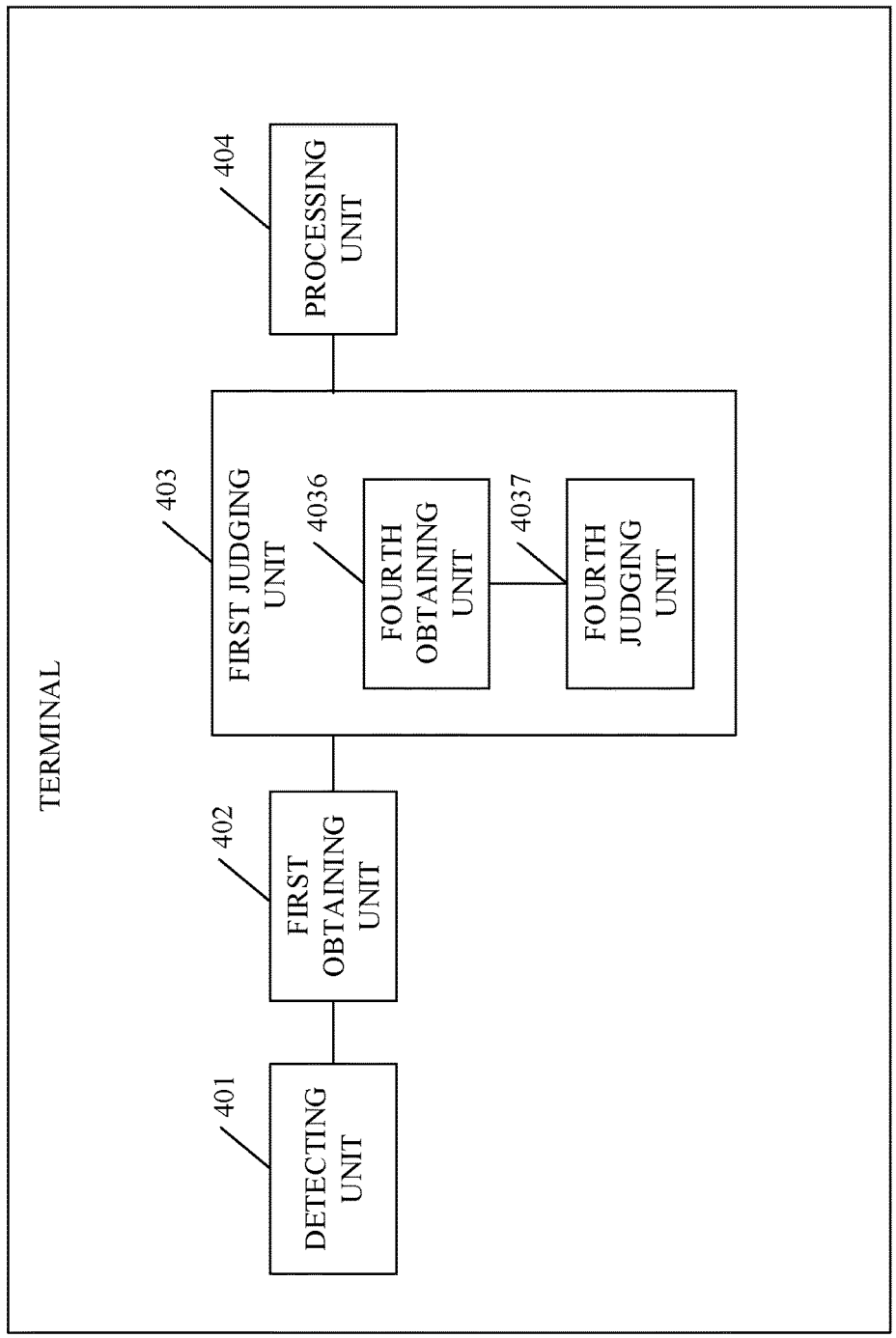
FIG. 7 is another structure diagram of the terminal according to a fourth implementation of the present disclosure.

Referring to FIG. 7, FIG. 7 is a structure diagram of another terminal according to a fourth implementation of the present disclosure, the detecting unit 401, the first obtaining unit 402, and the processing unit 404 have been described with reference to FIG. 5 and will not be repeated here. The first judging unit 403 further includes a fourth obtaining unit 4036 (such as a logic circuit) and a fourth determining unit 4037 (such as a logic circuit).

The fourth obtaining unit 4036 is configured to obtain the average value of the press force value during the press duration;

The fourth determining unit 4037 is configured to determine that the touch parameter matches the preset touch parameter if the average value is greater than or equal to a preset fourth press force threshold.

As can be seen from the implementations described above, a touch operation on a touch screen of a terminal can be detected, a touch parameter of the touch operation is obtained and the touch parameter includes a press force value and a press duration. The maximum value of the press force value during the press duration is obtained, a target duration from the detection of the touch operation until the press force value reaches the maximum value is recorded, so as to judge whether the target duration is less than or equal to a preset duration. If the target duration is less than or equal to the preset duration, the terminal determines that the touch operation is an invalid operation and will respond nothing to the touch operation; otherwise, the terminal determines that the touch operation is a valid operation, and can conduct an action triggered by the touch operation, thereby reducing the probability of the terminal being accidentally operated and enhancing user experience of the terminal.

Figure 8:
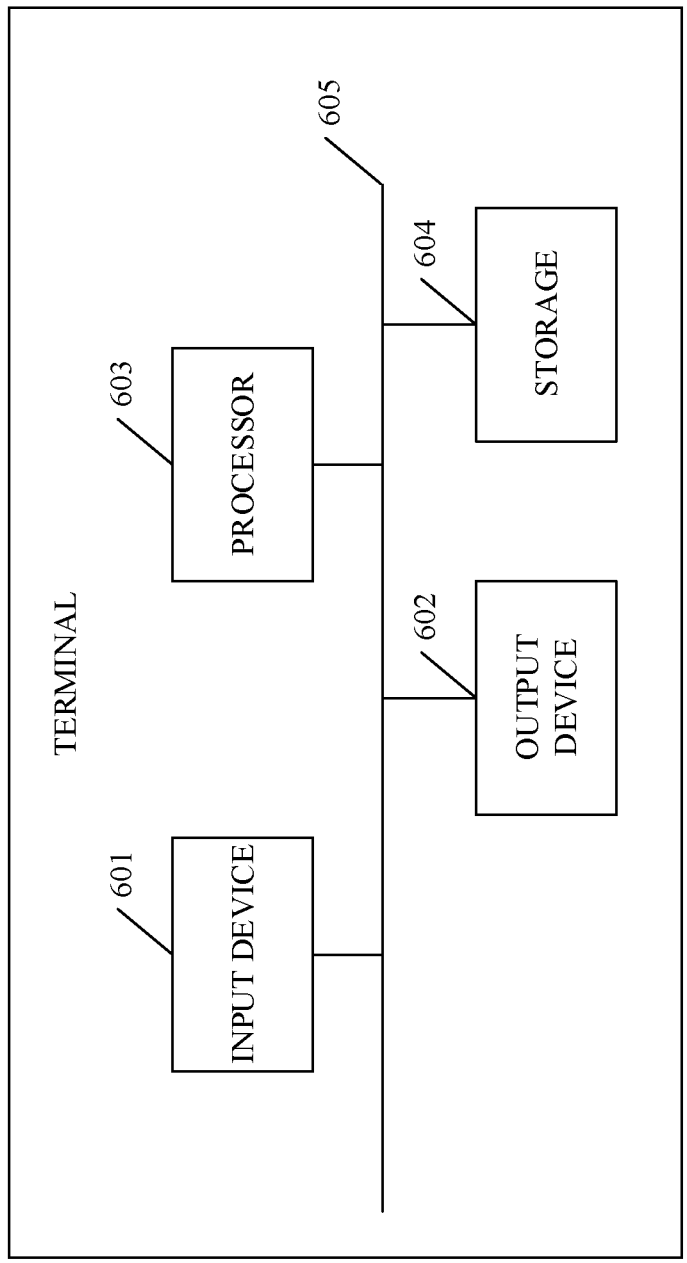
FIG. 8 is a structure diagram of the terminal according to a fifth implementation of the present disclosure.

Referring to FIG. 8, FIG. 8 is a structure diagram of a terminal according to a fifth implementation of the present disclosure. The terminal described in the implementation of the present disclosure includes at least one input device 601, at least one output device 602, at least one processor 603, such as a CPU, and a storage 604. The above-mentioned input device 601, the output device 602, the processor 603 and the storage 604 are connected though a bus 605.

The above-mentioned input device 601 can be a touch screen of the terminal, which is configured to detect a touch operation on the touch screen of the terminal.

The above-mentioned output device 602 can be a display screen of the terminal specifically, which is configured to display corresponding data information, The display screen can be integrated to the touch screen, that is, the touch screen can be integrated with a touch function with a display function, which can be used as a touch panel provided for touch operations of users, and can be used as a display screen for displaying corresponding data information to users of the terminal.

The storage 604 can be a high-speed RAM or a non-volatile memory, such as magnetic disk storage. The above-mentioned storage 604 is configured to store a set of program codes, and the above-mentioned input device 601, the output device 602 and processor 603 can be configured to call the program codes stored in the storage 604 to conduct the following operations.

The input device 601 is configured to detect the touch operation on the touch screen of the terminal.

The processor 603 is configured to obtain a touch parameter of the touch operation, so as to judge whether the touch parameter matches a preset touch parameter.

In some possible implementations, the processor 603 is further configured to determine that the touch operation is an invalid operation and respond nothing to the touch operation, if the touch parameter matches the preset touch parameter.

In some possible implementations, the processor 603 is further configured to determine that the touch operation is a valid operation and conduct an action triggered by the touch operation, if the touch parameter does not match the preset touch parameter.

In some possible implementations, the touch parameter includes a press force value and a press duration, and the manner in which the processor 603 judges whether the touch parameter matches the preset touch parameter as follows.

The processor 603 obtains the maximum value of the press force value during the press duration, records a target duration from the detection of the touch operation until the press force value reaches the maximum value, and judges whether the target duration is less than or equal to a preset duration. If the target duration is less than or equal to the preset duration, the processor 603 determines that the touch parameter matches the preset touch parameter.

In some possible implementations, the above-mentioned processor 603 is further configured to judge whether the maximum value is greater than or equal to a preset first press force threshold, and if the maximum value is greater than or equal to the preset first press force threshold, conduct the operation of recording the target duration from the detection of the touch operation until the press force value reaches the maximum value.

In some possible implementations, the touch parameter includes a press force value and a press duration, and the manner in which the processor 603 judges whether the touch parameter matches the preset touch parameter is as follows.

The processor 603 obtains the maximum value and the minimum value of the press force value during the press duration, calculates the difference between the maximum value and the minimum value on the basis of the maximum value and the minimum value, judges whether the difference is less than or equal to a preset second press force threshold, and if the difference is less than or equal to the preset second press force threshold, the processor 603 determines that the touch parameter matches the preset touch parameter.

In some possible implementations, the processor 603 is further configured to judge whether the maximum value is greater than or equal to a preset third press force threshold, and if the maximum value is greater than or equal to the preset third press force threshold, conduct the operation of calculating the difference between the maximum value and the minimum value on the basis of the maximum value and the minimum value.

In some possible implementations, the touch parameter includes a press force value and a press duration, and the manner in which the processor 603 judges whether the touch parameter matches the preset touch parameter is as follows.

The processor 603 obtains the average value of the press force value during the press duration, judges whether the average value is greater than or equal to a preset fourth press force threshold, and if the average value is greater than or equal to the preset fourth press force threshold, the processor 603 determines that the touch parameter matches the preset touch parameter.

In a specific implementation, the input device 601, the output device 602, and the processor 603 described in the implementation of the present disclosure can implement the method for preventing false touches on a terminal according to the first, second and third method implementation of the present disclosure, and can also implement the terminal according to the first and second terminal implementation of the present disclosure, and it will not be repeated here.

As can be seen from the implementations described above, a touch operation on a touch screen of a terminal can be detected and a touch parameter of the touch operation is obtained, so as to judge whether the touch parameter matches a preset touch parameter, and if the touch parameter matches the preset touch parameter, the terminal determines that the touch operation is an invalid operation and will respond nothing to the touch operation, thereby reducing the probability of the terminal being accidentally operated and enhancing user experience of the terminal.

In the above-mentioned implementations, the descriptions of various implementations each have a focus, and portions not detailed in one implementation can refer to a relevant description of the other implementations.

What needs to be explained is, for each of the aforementioned method implementation, for the sake of simplicity, it is generally described as a combination of a series of actions; however, those skilled in the art should know that the present disclosure is not restricted by the sequence of the actions described. Based on the present disclosure, some steps can be conducted in other sequences or simultaneously. Those skilled in the art should know that the implementations described herein are exemplary implementations, actions and units/modules involved may not be necessary for the present disclosure.

Among the implementations provided in the present disclosure, it should be understood that, the apparatus disclosed can be implemented in other ways. For example, the above-mentioned apparatus implementations are only schematic; for example, the division of the above-mentioned units is only a division of logic function, and other ways of division can be adopted when implemented. For example, a plurality of units or assemblies can be combined or integrated into another system, or some features can be omitted or not implemented. Mutual coupling, direct coupling, or communication connection displayed or discussed herein can be an indirect coupling or communication connection through some interfaces, devices, or units, and can be electrical or other forms.

The above-mentioned units illustrated as separate components may be or may not be separated physically, components displayed as units may be or may not be physical units and can be located in one place or distributed over a plurality of network units. Part of or all of the units can be chosen according to actual needs to achieve aims of solutions of the present disclosure.

Besides, each functional unit in implementations of the present disclosure can be integrated into a processing unit, or each functional unit can exist individually and physically, or two or more units can be integrated into a unit. The above-mentioned integrated units can be implemented in the form of software functional units or hardware.

If the above-mentioned integrated units are implemented in the form of software functional units and are sold or used as independent products, they can be stored in a computer readable storage medium. Based on this understanding, parts of the technical solutions of the present disclosure that make a contribution to the related art or all or part of the technical solutions can be embodied in the form of software products. The computer software products can be stored in a storage medium, including one or more instructions for causing computer equipment (such as a personal computer, a server, a network device and the like, and specifically, a processor of the computer equipment) to implement all or part of steps of the above-mentioned methods of the implementations of the present disclosure. The above-mentioned storage medium can include: USB flash disk, mobile disk, disk, Compact Disc (CD), Read-Only Memory (ROM) or Random Access Memory (RAM) and all kinds of medium that can store program codes.

The foregoing disclosed is merely exemplary implementations and it is not intended to limit the scope of the present disclosure; equivalents changes made on the basis of the claims of the present disclosure shall fall into the scope of the present disclosure.

What is claimed is:

1. A method for preventing false touches on a terminal, comprising:
   detecting a touch operation on a touch screen of a terminal, and obtaining a touch parameter of the touch operation;
   judging whether the touch parameter matches a preset touch parameter;
   when the touch parameter matches the preset touch parameter, determining that the touch operation is an invalid operation, and responding nothing to the touch operation;
   wherein the touch parameter comprises a press force value and a press duration, and judging whether the touch parameter matches the preset touch parameter comprises:
   obtaining the maximum value of the press force value during the press duration;
   recording a target duration from the detection of the touch operation until the press force value reaches the maximum value;
   judging whether the target duration is less than or equal to a preset duration; and
   when the target duration is less than or equal to the preset duration, determining that the touch parameter matches the preset touch parameter.

2. The method of claim 1, further comprising:
   when the touch parameter does not match the preset touch parameter, determining that the touch operation is a valid operation, and conducting an action triggered by the touch operation.

3. The method of claim 1, after obtaining the maximum value of the press force value during the press duration and before recording the target duration from the detection of the touch operation until the press force value reaches the maximum value, further comprising:
   judging whether the maximum value is greater than or equal to a preset first press force threshold; and
   when the maximum value is greater than or equal to the preset first press force threshold, recording the target duration from the detection of the touch operation until the press force value reaches the maximum value.

4. A terminal, comprising a hardware processor configured to:
   detect a touch operation on a touch screen of the terminal;
   obtain a touch parameter of the touch operation;
   judge whether the touch parameter matches a preset touch parameter;
   determine that the touch operation is an invalid operation and respond nothing to the touch operation, when the touch parameter matches the preset touch parameter;
   wherein the touch parameter comprises a press force value and a press duration and the hardware processor configured to judge whether the touch parameter matches the preset touch parameter is configured to:
   obtain the maximum value of the press force value during the press duration;
   record a target duration from the detection of the touch operation until the press force value reaches the maximum value; and
   judge whether the target duration is less than or equal to a preset duration and determine that the touch parameter matches the preset touch parameter when the target duration is less than or equal to the preset duration.

5. The terminal of claim 4, wherein the hardware processor is further configured to determine that the touch operation is a valid operation and conduct an action triggered by the touch operation, when the hardware processor judges that the touch parameter does not match the preset touch parameter.

6. The terminal of claim 4, wherein the hardware processor is further configured to judge whether the maximum value is greater than or equal to a preset first press force threshold and trigger the hardware processor to record the target duration from the detection of the touch operation until the press force value reaches the maximum value when judging that the maximum value is greater than or equal to the preset first press force threshold.

* * * * *